US010626215B2

(12) United States Patent
Kamiya

(10) Patent No.: US 10,626,215 B2
(45) Date of Patent: *Apr. 21, 2020

(54) PROCESS FOR PRODUCING ALUMINUM-CHELATE-BASED LATENT CURING AGENT, AND THERMOSETTING EPOXY RESIN COMPOSITION

(71) Applicant: DEXERIALS CORPORATION, Tokyo (JP)

(72) Inventor: Kazunobu Kamiya, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 40 days.

This patent is subject to a terminal disclaimer.

(21) Appl. No.: 16/061,153

(22) PCT Filed: Oct. 12, 2016

(86) PCT No.: PCT/JP2016/080275
§ 371 (c)(1),
(2) Date: Jun. 11, 2018

(87) PCT Pub. No.: WO2017/104244
PCT Pub. Date: Jun. 22, 2017

(65) Prior Publication Data
US 2018/0371155 A1  Dec. 27, 2018

(30) Foreign Application Priority Data
Dec. 17, 2015  (JP) ................................ 2015-245994

(51) Int. Cl.
*C08G 59/24*  (2006.01)
*C08G 18/28*  (2006.01)
(Continued)

(52) U.S. Cl.
CPC ........... *C08G 59/70* (2013.01); *C08G 18/222* (2013.01); *C08G 18/289* (2013.01);
(Continued)

(58) Field of Classification Search
CPC .... C08G 59/188; C08G 59/245; C08G 59/40; C08G 59/70; C08G 59/24; C08G 18/289;
(Continued)

(56) References Cited

U.S. PATENT DOCUMENTS

| 2010/0249338 | A1 | 9/2010 | Kamiya | |
|---|---|---|---|---|
| 2010/0331435 | A1 | 12/2010 | Kamiya | |
| 2011/0196110 | A1* | 8/2011 | Kamiya | C08G 59/70 525/454 |

FOREIGN PATENT DOCUMENTS

| JP | 2002-212537 A | 7/2002 |
|---|---|---|
| JP | 2008-156570 A | 7/2008 |

(Continued)

OTHER PUBLICATIONS

Dec. 13, 2016 Search Report issued in International Patent Application No. PCT/JP2016/080275.

*Primary Examiner* — David T Karst
(74) *Attorney, Agent, or Firm* — Oliff PLC

(57) ABSTRACT

An aluminum-chelate-based latent curing agent is capable of showing excellent solvent resistance and excellent storage stability at room temperature without impairing low temperature rapid curability of resin composition, when preparing one-pack type thermosetting epoxy resin composition by blending aluminum-chelate-based latent curing agent holding aluminum-chelating agent on porous resin particles obtained by subjecting polyfunctional isocyanate compound to interfacial polymerization into alicyclic epoxy resin showing extremely high cationic polymerizability. Aluminum-chelate-based latent curing agent for curing thermosetting epoxy resin is configured such that aluminum-chelating
(Continued)

agent is held on porous resin obtained by subjecting polyfunctional isocyanate compound to interfacial polymerization, and that surface activity inhibition treatment is performed by epoxy-alkoxy-silane coupling agent.

15 Claims, 5 Drawing Sheets

(51) Int. Cl.
    *C08G 18/80*     (2006.01)
    *C08G 18/22*     (2006.01)
    *C08G 59/18*     (2006.01)
    *C08G 59/40*     (2006.01)
    *C08K 5/5415*     (2006.01)
    *C08G 59/70*     (2006.01)

(52) U.S. Cl.
    CPC ....... *C08G 18/8029* (2013.01); *C08G 59/188* (2013.01); *C08G 59/24* (2013.01); *C08G 59/245* (2013.01); *C08G 59/40* (2013.01); *C08K 5/5415* (2013.01)

(58) Field of Classification Search
    CPC . C08G 18/8029; C08G 18/222; C08K 5/5415
    USPC .......................................................... 528/92
    See application file for complete search history.

(56) References Cited

FOREIGN PATENT DOCUMENTS

| | | |
|---|---|---|
| JP | 2009-197206 A | 9/2009 |
| JP | 2009-221465 A | 10/2009 |
| JP | 2010-168449 A | 8/2010 |
| JP | 2011-137117 A | 7/2011 |
| KR | 10-2011-0020775 A | 3/2011 |
| WO | 2016/024471 A1 | 2/2016 |
| WO | 2016/039193 A1 | 3/2016 |

\* cited by examiner

PROCESS FOR PRODUCING ALUMINUM-CHELATE-BASED LATENT CURING AGENT, AND THERMOSETTING EPOXY RESIN COMPOSITION

BACKGROUND OF THE INVENTION

Field of the Invention

The present invention relates to a process for producing aluminum-chelate-based latent curing agent for curing thermosetting epoxy resin, thermosetting urea resin, thermosetting melamine resin, thermosetting phenol resin and else. The present application claims priority based on Japanese Patent Application No. 2015-245994 filed in Japan on Dec. 17, 2015, which is incorporated by reference herein.

Description of Related Art

As curing agent showing low-temperature rapid curability with respect to epoxy resin, aluminum-chelate-based latent curing agent in the shape of fine particles holding aluminum-chelating agent on porous resin particles derived from polyfunctional isocyanate compound is in practical use. Such aluminum-chelate-based latent curing agent is produced by adding oil phase, in which polyfunctional isocyanate compound and aluminum-chelating agent having behavior capable of curing epoxy resin (epoxy resin curability) are dissolved or dispersed in slightly water-soluble organic solvent, into aqueous phase containing dispersing agent to be subjected to interfacial polymerization.

Recently, it is proposed to additionally filling aluminum-chelating agent into aluminum-chelate-based latent curing agent, by immersing once obtained aluminum-chelate-based latent curing agent in aluminum-chelating agent solution in which aluminum-chelating agent is dissolved in organic solvent, and by impregnating the resulting solution in porous resin composing aluminum-chelate-based latent curing agent, in order to improve curing speed of thermosetting epoxy resin composition containing aluminum-chelate-based latent curing agent (Patent Literature 1).

Patent Literature 1: JP 2008-156570 A

SUMMARY OF THE INVENTION

However, as described in Patent Literature 1, in a case of aluminum-chelate-based latent curing agent additionally filled with aluminum-chelating agent having epoxy curability, content ratio of aluminum-chelating agent in aluminum-chelate-based latent curing agent will be increased, but it is not possible to increase content ratio of aluminum-chelating agent in aluminum-chelate-based latent curing agent more than concentration of aluminum-chelating agent in aluminum-chelating agent solution, so there is a problem that it is not possible to respond sufficiently to a request of industry to improve curing speed of thermosetting epoxy resin composition further.

Also, in a case of aluminum-chelate-based latent curing agent additionally filled with aluminum-chelating agent, even if aluminum-chelating agent existing on a surface is washed and removed by organic solvent such as cyclohexane, there will be active aluminum-chelating agent existing in relatively high concentration near the surface. Therefore, about one-pack type thermosetting epoxy resin composition blending such aluminum-chelate-based latent curing agent in epoxy resin (especially, alicyclic epoxy resin showing extremely high cationic polymerizability), there was a problem that it cannot say that storage stability at room temperature is sufficient.

The purpose of the present invention is to solve the above problems of the prior art, and to be able to produce aluminum-chelate-based latent curing agent with high content ratio of aluminum-chelating agent more than concentration of aluminum-chelating agent of aluminum-chelating agent solution prepared when additionally filling aluminum-chelating agent to aluminum-chelate-based latent curing agent by immersing aluminum-chelate-based latent curing agent, in which aluminum-chelating agent is held on porous resin particles obtained by subjecting polyfunctional isocyanate compound to interfacial polymerization, in aluminum-chelating agent solution. At the same time, the purpose of the present invention is to be able to produce aluminum-chelate-based latent curing agent enabling one-pack type thermosetting epoxy resin composition, which is prepared by adding aluminum-chelate-based latent curing agent additionally filled with aluminum-chelating agent as the above to alicyclic epoxy resin, to show excellent storage stability at room temperature, and further, enabling to show similar excellent storage stability even in presence of epoxy resin and solvent.

The present inventor has found that, by immersing aluminum-chelate-based latent curing agent in aluminum-chelating agent solution, if the immersion is performed while removing solvent of aluminum-chelating agent solution when additionally filling aluminum-chelating agent into the aluminum-chelate-based latent curing agent, concentration of aluminum-chelating agent of aluminum-chelating agent solution will be increased, so as a result, it is possible to highly fill aluminum-chelating agent into aluminum-chelate-based latent curing agent. In addition, the present inventor has found that, by performing activity inhibition treatment to a surface of such aluminum-chelate-based latent curing agent highly filled with aluminum-chelating agent by epoxy-alkoxy-silane coupling agent, it is possible to almost completely deactivate aluminum-chelating agent presented on the surface to be latently presented, and also, found that one-pack type thermosetting epoxy resin composition, obtained by blending aluminum-chelate-based latent curing agent performed with surface activity inhibition treatment by epoxy-alkoxy-silane coupling agent into alicyclic epoxy resin showing extremely high cationic polymerization, shows excellent storage stability at room temperature without impairing low temperature rapid curability, and completed the present invention.

In other words, the present invention is a process for producing aluminum-chelate-based latent curing agent in which aluminum-chelating agent and silane compound are held on porous resin obtained by subjecting polyfunctional isocyanate compound to interfacial polymerization, wherein the process comprises following steps (A) to (C).

(Step A: Step for Preparing Particulate Curing Agent)

A step for preparing particulate curing agent by subjecting polyfunctional isocyanate compound to interfacial polymerization to obtain porous resin by adding oil phase obtained by dissolving or dispersing aluminum-chelating agent, silane compound and polyfunctional isocyanate compound in volatile organic solvent into aqueous phase containing dispersing agent while heating and stirring, and by holding aluminum-chelating agent and silane compound on obtained porous resin.

(Step B: Step for Additionally Filling Aluminum-Chelating Agent)

A step for additionally filling aluminum-chelating agent into particulate curing agent by dispersing and mixing particulate curing agent obtained in the step A in aluminum-chelating agent solution in which aluminum-chelating agent is dissolved in volatile organic solvent, and by removing volatile organic solvent while stirring obtained dispersed mixture.

(Step C: Step for Surface Activity Inhibition Treatment)

A step for obtaining aluminum-chelate-based latent curing agent latently presented by surface activity inhibition treatment with epoxy-alkoxy-silane coupling agent, by immersing particulate curing agent additionally filled with aluminum-chelating agent in solution in which epoxy-alkoxy-silane coupling agent is dissolved in organic solvent.

In addition, the present invention provides thermosetting epoxy resin composition containing aluminum-chelate-based latent curing agent produced by the above production process, epoxy resin, and silane compound.

In the process for producing aluminum-chelate-based latent curing agent of the present invention, after holding aluminum-chelating agent having epoxy curability and silane compound on porous resin obtained by subjecting polyfunctional isocyanate compound to interfacial polymerization, aluminum-chelating agent is additionally filled in porous resin. Therefore, obtained aluminum-chelate-based latent curing agent is able to cure epoxy resin rapidly, and it is possible to show sharp heat responsibility at low temperature region. Also, a surface of particulate aluminum-chelate-based latent curing agent is performed with activity inhibition treatment by epoxy-alkoxy-silane coupling agent, so activity of aluminum-chelating agent remained on the surface is inhibited. Therefore, aluminum-chelate-based latent curing agent produced by production process of the present invention shows excellent solvent resistance, and also, with respect to one-pack type thermosetting epoxy resin composition obtained by blending the aluminum-chelate-based latent curing agent into alicyclic epoxy resin showing extremely high cationic polymerization, it is possible to achieve excellent storage stability at room temperature.

DETAILED DESCRIPTION OF THE INVENTION

Figure 1:
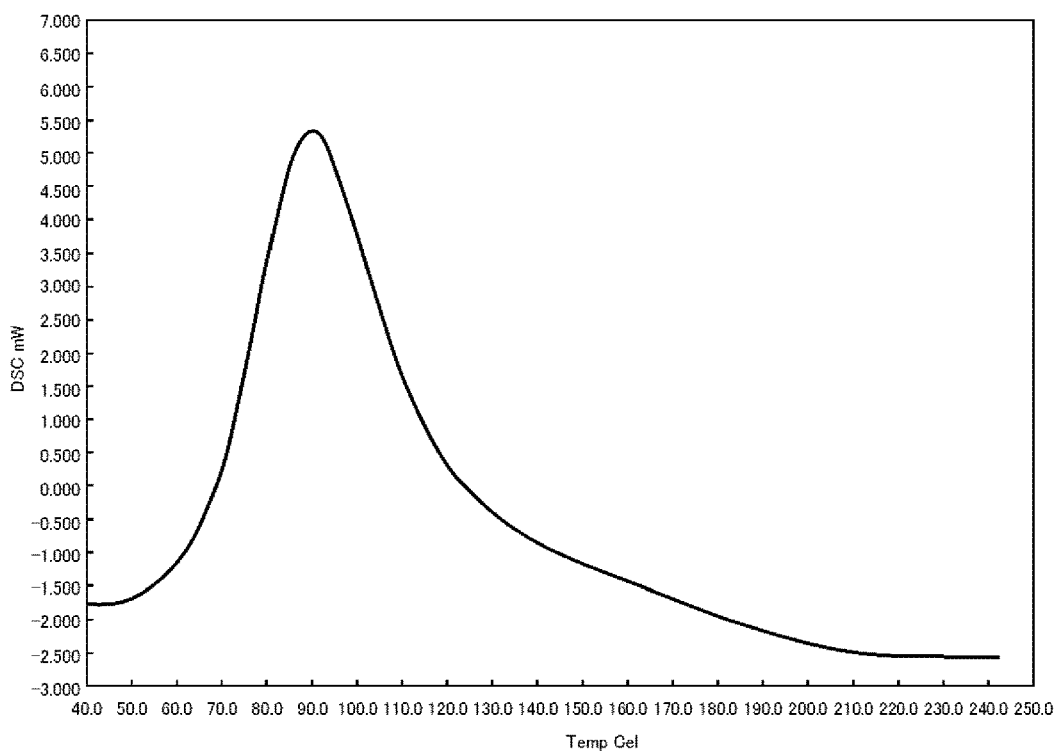
FIG. 1 is a DSC chart of thermosetting epoxy resin composition using particulate curing agent prepared by the step A of example 1.

<<Process for Producing Aluminum-Chelate-Based Latent Curing Agent>>

A process for producing aluminum-chelate-based latent curing agent of the present invention, in which aluminum-chelating agent is held on porous resin obtained by subjecting polyfunctional isocyanate compound to interfacial polymerization, and having following steps (A) to (C). Hereinafter, explaining in detail about each step.

<Step A: Step for Preparing Particulate Curing Agent>

At first, oil phase obtained by dissolving or dispersing aluminum-chelating agent, silane compound and polyfunctional isocyanate compound in volatile organic solvent is added into aqueous phase containing dispersing agent, and by heating (normally, it is heated so that a temperature of mixture will be 30 to 90 增) it while stirring, polyfunctional isocyanate compound is subjected to interfacial polymerization to obtain porous resin, and particulate curing agent is prepared by holding aluminum-chelating agent and silane compound on obtained porous resin. This particulate curing agent can be disintegrated into primary particles by publicly known disintegrating device, after filtering, washing and drying according to need.

Porous resin derived from polyfunctional isocyanate compound composing such particulate curing agent is obtained by polymerization by a part of isocyanate group becomes amino group by undergoing hydrolysis while interfacial polymerization, and by the amino group and isocyanate group reacted to generate urea bond, so it can be regarded as porous polyurea. When particulate curing agent composed of such porous resin and aluminum-chelating agent held in its pores is heated, its clear reason is unidentified, but aluminum-chelating agent held on porous resin contacts silane compound such as silane coupling agent or silanol compound existing at outside of porous resin, and it is possible to start cationic polymerization of epoxy resin.

(Preparation of Oil Phase in Interfacial Polymerization)

In this production process, at first, aluminum-chelating agent, silane compound and polyfunctional isocyanate compound are dissolved or dispersed in volatile organic solvent, and oil phase in interfacial polymerization is prepared.

Concerning blending ratio of aluminum-chelating agent and polyfunctional isocyanate compound, when blending quantity of aluminum-chelating agent is too low, curability of epoxy resin to be cured will be decreased, and when blending quantity of aluminum-chelating agent is too high, latency of aluminum-chelate-based latent curing agent will be decreased, so blending quantity of aluminum-chelating agent is preferably 10 to 500 mass parts, more preferably 10 to 300 mass parts, with respect to 100 mass parts of polyfunctional isocyanate compound composing porous resin.

In addition, radically polymerizable compound and initiator of radical polymerization may be blended in this oil phase, in order to improve low temperature curability.

Blending quantity of silane compound to be blended in oil phase is preferably 1 to 500 mass parts, more preferably 1 to 300 mass parts, with respect to 100 mass parts of aluminum-chelating agent. In this range, effect to be able to maintain particle shape can be obtained.

In addition, when radically polymerizable compound and initiator of radical polymerization are blended in oil phase, preferably 1 to 80 mass parts, more preferably 10 to 60 mass parts of radically polymerizable compound is blended with respect to 100 mass parts of polyfunctional isocyanate compound. In this range, it is possible to impart excellent low temperature activity to particulate curing agent. In this case, preferably 0.1 to 10 mass parts, more preferably 0.5 to 5 mass parts of initiator of radical polymerization is blended with respect to 100 mass parts of radically polymerizable compound for starting polymerization.

When dissolving or dispersing aluminum-chelating agent, silane compound and polyfunctional isocyanate compound, and according to need, radically polymerizable compound and initiator of radical polymerization in volatile organic solvent, it may be just mixed and stirred at room temperature and under atmospheric pressure, but it may be heated according to need.

Here, reason for using volatile organic solvent is as follows. That is, when high boiling point solvent in which boiling point is over 300° as used in normal interfacial polymerization is used, organic solvent will not be volatilized while interfacial polymerization, so contact probability with isocyanate-water will not be increased and progress of interfacial polymerization between them will be insufficient. Therefore, it is difficult to obtain polymer excellent in shape retention even by interfacial polymerization, and also, even if it is obtained, high boiling point solvent is still incorporated in the polymer, so when it is blended in thermosetting resin composition, high boiling point solvent causes bad influence on physical property of cured product of thermosetting resin composition. Therefore, in this production process, it is preferable to use volatile organic solvent as organic solvent used when preparing oil phase.

As such volatile organic solvent, good solvent (respective solubility is preferably 0.1 g/ml (organic solvent) or more) of each of aluminum-chelating agent, silane compound and polyfunctional isocyanate compound, and also, radically polymerizable compound and initiator of radical polymerization blended according to need, which substantially does not dissolve in water (solubility of water is 0.5 g/ml (organic solvent) or less), and in which boiling point under atmospheric pressure is 100° or less, is preferable. As concrete examples of such volatile organic solvent, alcohols, acetic esters, ketones or the like can be cited. Among them, ethyl acetate is preferable in points of high polarity, low boiling point, and poor water solubility.

Used amount of volatile organic solvent is preferably 10 to 500 mass parts with respect to 100 mass parts of sum of aluminum-chelating agent, silane compound and polyfunctional isocyanate compound, and also, radically polymerizable compound and initiator of radical polymerization blended according to need, as particle size will be polydispersed when used amount is too low, and as curing characteristics will be decreased when used amount is too high.

In addition, in a range of used amount of volatile organic solvent, it is possible to decrease viscosity of solution to be oil phase by using relatively high used amount of volatile organic solvent and else, but stirring efficiency will be improved when viscosity is decreased, so it is possible to uniformize and make oil phase drop to be more fine in reaction system, and it is possible to make particle size distribution to be monodispersed, while controlling size of latent curing agent particles obtained accordingly to be a size in degree of submicron to few micron. Viscosity of solution to be oil phase is preferable to be set in 1 to 500 mPa·s.

(Preparation of Aqueous Phase in Interfacial Polymerization)

Aqueous phase is solution in which dispersing agent is dissolved in water. As dispersing agent, it is possible to use publicly known dispersing agent used in interfacial polymerization. For example, it is possible to use polyvinyl alcohol (PVA), carboxymethyl cellulose, gelatin, or the like, and among them, it is preferable to use polyvinyl alcohol (PVA). Used amount of dispersing agent is normally 0.1 to 10.0 mass % of aqueous phase. In addition, as water, desalted and distilled water can be used preferably.

In addition, when PVA is used as dispersing agent, hydroxyl group of PVA and polyfunctional isocyanate compound are reacted when emulsion dispersing polyfunctional isocyanate compound or the like in aqueous phase, so byproducts adhere around latent curing agent particles as foreign substances, and shape of particles themselves will be deformed. In order to prevent this phenomenon, it can be cited to accelerate reactivity of polyfunctional isocyanate compound and water, or to inhibit reactivity of polyfunctional isocyanate compound and PVA.

In order to accelerate reactivity of polyfunctional isocyanate compound and water, blending quantity of aluminum-chelating agent is adjusted to be preferably ½ or less, more preferably ⅓ or less on the basis of weight of polyfunctional isocyanate compound. Thereby, probability of contact of polyfunctional isocyanate compound and water becomes high, and polyfunctional isocyanate compound and water tend to react before PVA contacts surface of oil phase drop.

In addition, in order to inhibit reactivity of polyfunctional isocyanate compound and PVA, it can be cited to increase blending quantity of aluminum-chelating agent in oil phase. Concretely, blending quantity of aluminum-chelating agent is adjusted to be preferably equal or more, more preferably 1.0 to 5.0 times on the basis of weight of polyfunctional isocyanate compound. Thereby, concentration of isocyanate on surface of oil phase drop will be decreased. Further, reaction (interfacial polymerization) rate of polyfunctional isocyanate compound with amine formed by hydrolysis is higher than with hydroxyl group, so it is possible to decrease reaction probability of polyfunctional isocyanate compound and PVA.

(Implementation of Interfacial Polymerization)

Next, in this production process, oil phase is added into aqueous phase, and heated and stirred to perform interfacial polymerization. When radically polymerizable compound and initiator of radical polymerization are blended in oil phase, radical polymerization is also performed simultaneously. Thereby, porous resin derived from polyfunctional isocyanate compound is generated, and aluminum-chelating agent and silane compound are held on porous resin, and particulate curing agent is obtained.

As mode of this holding, it is having a structure in which aluminum-chelating agent and silane compound are incorporated and held in many fine pores existing in porous resin matrix, and it is not a microcapsule of simple structure in which surroundings of cores of aluminum-chelating agent and silane compound are coated with shell of porous resin.

A shape of particulate curing agent obtained by interfacial polymerization is spherical, and its particle size (it can be considered as particle size of aluminum-chelate-based latent curing agent) is preferably 0.5 to 100 μm, from an aspect of curability and dispersibility, and also, size of pores are preferably 1 to 150 nm, from an aspect of curability and latency.

In addition, there is a tendency that latency of particulate curing agent will be decreased when degree of crosslinking of used porous resin is too low, and that thermal response of particulate curing agent will be decreased when degree of crosslinking of used porous resin is too high. Therefore, according to purpose of use of particulate curing agent, it is preferable to adjust the degree of crosslinking by blending quantity of emulsion oil phase of aluminum-chelating agent and silane compound and by temperature of polymerization. Here, the degree of crosslinking of porous resin can be measured by micro compression test.

In addition, blending quantity of oil phase with respect to aqueous phase at the time of interfacial polymerization is preferably 5 to 70 mass parts with respect to 100 mass parts of aqueous phase, as it will be polydispersed when oil phase is too little, and as flocculation occurs by refinement when oil phase is too much.

As condition of treatment in interfacial polymerization, it is possible to cite a condition for heating and stirring normally in atmospheric pressure, temperature of 30 to 80增, stirring time of 2 to 12 hours, in stirring condition in which size of oil phase will be preferably 0.5 to 100≈m (stirring device: homogenizer; rate of stirring: 6000 rpm or more).

After end of interfacial polymerization (and radical polymerization performed according to need), particulate curing agent can be obtained by filtrating polymer fine particles, and by natural drying or vacuum drying.

In addition, it is possible to control curing characteristics of aluminum-chelate-based latent curing agent, which is the object of the process, by changing used amount or type of polyfunctional isocyanate compound, used amount or type of aluminum-chelating agent, condition of interfacial polymerization, used amount or type of silane compound or radically polymerizable compound and initiator of radical polymerization, and condition of radical polymerization. For example, it is possible to decrease curing temperature by decreasing polymerization temperature, and vice versa, it is possible to increase curing temperature by increasing polymerization temperature.

(Aluminum-Chelating Agent)

As aluminum-chelating agent to be blended in oil phase, it is possible to cite complex compound in which three $\beta$-keto enolate negative ions are coordinated with aluminum, as indicated in formula (1).

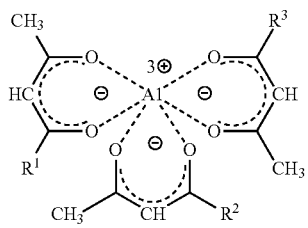

(1)

Here, $R^1$, $R^2$ and $R^3$ are each independently alkyl group or alkoxyl group. As alkyl group, methyl group, ethyl group or the like can be cited. As alkoxyl group, methoxy group, ethoxy group, oleyl oxy group or the like can be cited.

As concrete examples of aluminum-chelating agent indicated in formula (1), aluminum tris (acetylacetonate), aluminum tris (ethyl acetoacetate), aluminum mono acetylacetonate bis (ethyl acetoacetate), aluminum mono acetylacetonate bis oleyl acetoacetate, ethyl acetoacetate aluminum diisopropylate, alkyl acetoacetate aluminum diisopropylate, or the like can be cited.

(Polyfunctional Isocyanate Compound)

Polyfunctional isocyanate compound blended in oil phase is a compound preferably having two or more isocyanate groups, preferably three isocyanate groups in one molecule. As preferable examples of such trifunctional isocyanate compound, TMP adduct of formula (2) in which 1 mol of trimethylolpropane is reacted with 3 mol of diisocyanate compound, isocyanurate of formula (3) in which 3 mol of diisocyanate compound is self-condensed, and burette of formula (4) in which diisocyanate urea obtained from 2 mol of diisocyanate among 3 mol of diisocyanate compound is condensed with remaining 1 mol of diisocyanate can be cited.

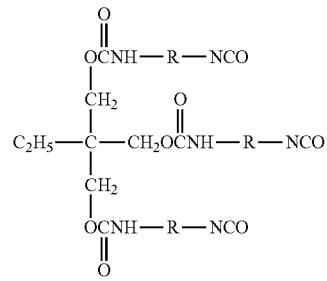

(2)

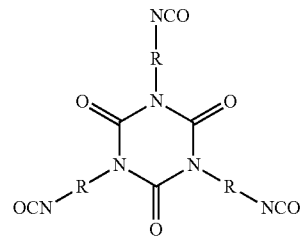

(3)

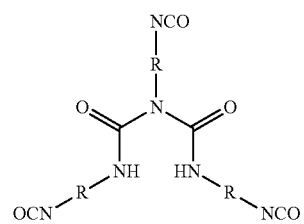

(4)

In the formulas (2) to (4), a substituent R is a part of diisocyanate compound except for isocyanate group. As concrete examples of such diisocyante compound, toluene 2,4-diisocyanate, toluene 2,6-diisocyanate, m-xylylene diisocyanate, hexamethylene diisocyanate, hexahydro-m-xylylene diisocyanate, isophorone diisocyanate, methylene diphenyl-4, 4¨-diisocyanate, or the like can be cited.

(Silane Compound)

As described in paragraphs [0007] to [0010] of Publication No. JP 2002-212537 A, silane compound which can be blended in oil phase is having a function to start cationic polymerization of thermosetting resin (for example, thermosetting epoxy resin) working together with aluminum-chelating agent held on aluminum-chelate-based latent curing agent. Therefore, by using such silane compound together with aluminum-chelating agent, it is possible to obtain an effect to accelerate curing of epoxy resin. As such silane compound, high sterically hindered silanol compound, or silane coupling agent having one to three low grade alkoxy groups in one molecule, or the like can be cited. In addition, it may have a group having reactivity with respect to functional group of thermosetting resin, for example vinyl group, styryl group, acryloyloxy group, methacryloyloxy group, epoxy group, amino group, mercapto group, or the like in molecule of silane coupling agent, but coupling agent having amino group or mercapto group can be used, when amino group or mercapto group does not capture generated cationic species substantially, as latent curing agent of the present invention is cationic curing agent.

When high sterically hindered silanol compound is contained in oil phase as silane compound, blending quantity of high sterically hindered silanol compound is preferably 1 to 500 mass parts, more preferably 1 to 300 mass parts with respect to 100 mass parts of aluminum-chelating agent, as curing will be insufficient when blending quantity of silanol compound is too low, and as latency will be decreased when blending quantity of silanol compound is too high.

High sterically hindered silanol compound which can be blended in oil phase is arylsilanol having chemical structure of following formula (A), and differs from conventional silane coupling agent having trialkoxy group

(Ar)$_m$Si(OH)$_n$         (A)

In the formula, m is 2 or 3, preferably 3, however sum of m and n is 4. Therefore, silanol compound of the formula (A) is monool or diol. 'Ar_ is aryl group which may be substituted, but as aryl group, phenyl group, naphthyl group (for example, 1 or 2-naphthyl group), anthracenyl group (for example, 1, 2 or 9-anthracenyl group, benz [a]-9-anthracenyl group), phenaryl group (for example, 3 or 9-phenaryl group), pyrenyl group (for example, 1-pyrenyl group), azulenyl group, fluorenyl group, biphenyl group (2, 3 or 4-biphenyl group), thienyl group, furyl group, pyrrolyl group, imidazolyl group, pyridyl group, or the like can be cited. Among them, phenyl group is preferable from an aspect of cost and easiness of acquisition. m pieces of Ar may be identical to each other or may be different to each other, but from an aspect of easiness of acquisition, it is preferable to be identical.

These aryl groups can have 1 to 3 substitutes, and for example, electron withdrawing group such as halogen such as chloro or bromo; trifluoromethyl; nitro; sulfo; carboxyl; alkoxycarbonyl such as methoxycarbonyl or ethoxycarbonyl; formyl; and electron donating group such as alkyl such as methyl, ethyl or propyl; alkoxy such as methoxy or ethoxy; hydroxy; amino; monoalkyl amino such as monomethyl amino; dialkyl amino such as dimethyl amino, or the like can be cited. In addition, it is possible to increase acidity of hydroxyl group of silanol by using electron withdrawing group as substituent, and vice versa, it is possible to decrease acidity by using electron donating group, so it will be possible to control activity of curing. Here, substituents may be different per m pieces of Ar, but it is preferable that substituents are identical in m pieces of Ar from an aspect of easiness of acquisition. In addition, substituent may be existed only in some of Ar, there may be no substituent in other Ar. As concrete examples of phenyl group having substituent, 2, 3 or 4-methyl phenyl group; 2,6-dimethyl, 3,5-dimethyl, 2,4-dimethyl, 2,3-dimethyl, 2,5-dimethyl or 3,4-dimethyl phenyl group; 2,4,6-trimethyl phenyl group; 2 or 4-ethyl phenyl group, or the like can be cited.

Among silanol compound of the formula (A), triphenyl silanol or diphenyl silane diol can be cited as preferable. Triphenyl silanol is especially preferable.

On the other hand, when silane coupling agent having one to three low grade alkoxy groups in molecule is used as silane compound, blending quantity of silane coupling agent in oil phase is preferably 1 to 50 mass parts, more preferably 1 to 30 mass parts with respect to 100 mass parts of aluminum-chelating agent, as addition effect cannot be expected if the blending quantity is too low, and as it occurs influence of polymerization terminating reaction by silanolate anion generated from silane coupling agent if the blending quantity is too high.

As concrete examples of silane coupling agent which can be blended in oil phase, vinyltris (β-methoxy ethoxy) silane, vinyltriethoxysilane, vinyltrimethoxysilane, ·~styryl trimethoxysilane, ·~methacryloxypropyl trimethoxysilane, ·~acryloxypropyl trimethoxysilane, β-(3, 4-epoxycyclohexyl) ethyltrimethoxysilane, ·~glycidoxypropyl trimethoxysilane, ·~glycidoxypropyl methyldiethoxysilane, N-β-(aminoethyl)-·~aminopropyl trimethoxysilane, N-β-(aminoethyl)-·~aminopropyl methyldimethoxysilane, ·~aminopropyl triethoxysilane, N-phenyl-·~aminopropyl trimethoxysilane, ·~mercaptopropyl trimethoxysilane, ·~chlolopropyl trimethoxysilane, or the like can be cited.

(Radically Polymerizable Compound)

In addition, radically polymerizable compound which can be blended in oil phase will be radically polymerized simultaneously at the time of interfacial polymerization of polyfunctional isocyanate compound, and improves mechanical property of porous resin which will be microcapsule wall. Thereby, it is possible to achieve heat responsibility at the time of curing of epoxy resin, especially it is possible to achieve sharp heat responsibility in low temperature region. This reason is not clarified, but it is considered as because interfacial polymerization and radical polymerization occurs simultaneously and phase-separated structure is formed in porous resin, and as a result, crosslink density of polyurea-urethane part will be smaller than homopolymerization system of isocyanate compound.

Such radically polymerizable compound is preferably having one or more carbon-carbon unsaturated bond in molecule, and contains so-called monofunctional radically polymerizable compound or polyfunctional radically polymerizable compound, but in the present invention, it is preferable that radically polymerizable compound contains polyfunctional radically polymerizable compound. This is because it will be easier to achieve sharp heat responsibility in low temperature region by using polyfunctional radically polymerizable compound. Also from this point, radically polymerizable compound preferably contains at least 20 mass % or more, more preferably at least 50 mass % or more of polyfunctional radically polymerizable compound.

A s monofunctional radically polymerizable compound, monofunctional vinyl compound such as styrene or methylstyrene, monofunctional (metha) acrylate compound such as butylacrylate, or the like can be cited. As polyfunctional radically polymerizable compound, polyfunctional vinyl compound such as divinylbenzene, polyfunctional (metha) acrylate compound such as 1,6-hexanediol diacrylate or trimethylolpropane triacrylate, can be cited. Among them, it is preferable to use polyfunctional vinyl compound, especially divinylbenzene, from an aspect of latency and heat responsibility.

In addition, polyfunctional radically polymerizable compound may be composed from polyfunctional vinyl compound and polyfunctional (metha) acrylate compound. By using both of them together, it is possible to obtain effects to be able to change heat responsibility, and to be able to introduce reactive functional group.

(Initiator of Radical Polymerization)

As initiator of radical polymerization which can be blended in oil phase, it is possible to use a compound which can initiate radical polymerization under condition of interfacial polymerization of polyfunctional isocyanate compound, and for example, peroxide initiator, azo initiator, or the like can be used.

<Step B: Step for Additionally Filling Aluminum-Chelating Agent>

Next, aluminum-chelating agent is additionally filled in particulate curing agent obtained in the step A by dispersing and mixing particulate curing agent in aluminum-chelating agent solution in which aluminum-chelating agent is dissolved in volatile organic solvent, and by removing volatile organic solvent while stirring obtained dispersed mixture. By removing volatile organic solvent, concentration of aluminum-chelating agent in aluminum-chelating agent solution is increased, and as a result, amount of aluminum-chelating agent held in pores of porous resin of particulate curing agent is increased. In addition, particulate curing agent additionally filled with aluminum-chelating agent can be disintegrated into primary particles by publicly known disintegrating device, after filtering, washing and drying according to need.

As aluminum-chelating agent used in the step B, it is possible to use aluminum-chelating agent different from aluminum-chelating agent used in the step A, but it is preferable to use same aluminum-chelating agent from an aspect of control of used amount. In addition, as volatile organic solvent for dissolving aluminum-chelating agent, it is possible to use volatile organic solvent used in oil phase of the step A.

Concentration of aluminum-chelating agent in aluminum-chelating agent solution is preferably 10 to 80 mass %, more preferably 10 to 50 mass %. Within this range, it is possible to achieve high permeability of aluminum-chelating agent solution into particulate curing agent.

Blending quantity of particulate curing agent with respect to 100 mass parts of aluminum-chelating agent solution is preferably 10 to 80 mass parts, more preferably 10 to 50 mass parts. Within this range, it is possible to achieve excellent dispersion stability of particulate curing agent.

Regarding techniques of operation for dispersing and mixing particulate curing agent into aluminum-chelating agent solution and operation for stirring dispersed mixture, it is possible to use publicly known manners.

Removal of volatile organic solvent from dispersed mixture is an operation to increase concentration of aluminum-chelating agent in dispersed mixture, and it is possible to adopt an operation for removing in optional technique, unless aluminum-chelating agent is decomposed. For example, it can be cited that temperature of dispersed mixture may be heated to a temperature equal to or more than boiling point of used volatile organic solvent, or inside of stirring system of dispersed mixture may be depressurized, or surface of dispersed mixture may be air blown.

Regarding removal of volatile organic solvent, the extent of removal is to the extent that preferably 50 to 95% of added volatile organic solvent is removed. Within this range, aluminum-chelating agent can be highly filled in pores of particulate curing agent. In addition, removal rate is preferably 10 to 60 weight %/hour. Within this range, aluminum-chelating agent will be supplemented effectively in pores of particulate curing agent.

<Step C: Step for Surface Activity Inhibition Treatment>

Next, particulate curing agent additionally filled with aluminum-chelating agent is performed with surface activity inhibition treatment by epoxy-alkoxy-silane coupling agent, by immersing the particulate curing agent in solution in which epoxy-alkoxy-silane coupling agent is dissolved in organic solvent, thereby latently presented aluminum-chelate-based latent curing agent is obtained. When immersing, it is possible to be stirred. Concretely, surface activity inhibition treatment is performed to be latently presented by immersing particulate curing agent additionally filled with aluminum-chelating agent in solution, in which epoxy-alkoxy-silane coupling agent is dissolved in organic solvent, preferably nonpolar solvent, especially cyclohexane in preferably 5 to 80% (by mass), for 1 to 20 hours at 25 to 80 増. Thereby, aluminum-chelate-based latent curing agent performed with activity inhibition treatment on surface can be obtained. Obtained aluminum-chelate-based latent curing agent can be disintegrated into primary particles by publicly known disintegrating device, after filtering, washing and drying according to need.

It is preferable that aluminum-chelate-based latent curing agent substantially does not contain organic solvent used in the steps A to C, concretely, it is preferable that it is 1 ppm or less, from an aspect of curing stability.

(Epoxy-Alkoxy-Silane Coupling Agent for Surface Activity Inhibition Treatment)

In the present invention, epoxy-alkoxy-silane coupling agent used in surface activity inhibition treatment can decrease activity of active aluminum-chelating agent on surface of particulate curing agent by coating the surface with epoxy polymer chain generated by reacting epoxy groups in molecule. As concrete examples of this epoxy type silane coupling agent, alicyclic epoxy silane coupling agent such as 2-(3,4-epoxycyclohexyl) ethyl trimethoxysilane (KBM-303, Shin-Etsu Chemical Co., Ltd.) and glycidyloxysilane coupling agent such as 3-glycidoxypropyl trimethoxysilane (KBM-403, Shin-Etsu Chemical Co., Ltd.) can be cited. Among them, alicyclic epoxy silane coupling agent is preferable from an aspect of being able to form polymer coating at relatively low temperature of room temperature to 40 増.

Aluminum-chelate-based latent curing agent explained in the above can further contain filling agent such as silica, mica or the like, pigment, antistatic agent, or the like, according to need.

<<Thermosetting Epoxy Resin Composition>>

Aluminum-chelate-based latent curing agent of the present invention can provide low-temperature rapid-curing thermosetting epoxy resin composition by adding it to epoxy resin and silane compound. Such thermosetting epoxy resin composition is also a part of the present invention.

In addition, content of aluminum-chelate-based latent curing agent in thermosetting epoxy resin composition of the present invention is 1 to 70 mass parts, preferably 1 to 50 mass parts with respect to 100 mass parts of epoxy resin, as it will not be cured sufficiently if the content is too low, and as resin property (for example, flexibility) of cured product of the composition will be decreased if the content is too high.

Epoxy resin composing thermosetting epoxy resin composition of the present invention is a resin used as film forming component. As such epoxy resin, not only alicyclic epoxy resin such as 3˜, 4˜-epoxycyclohexyl methyl 3,4-epoxycyclohexane carboxylate, but also, glycidylether type epoxy resin, which could not be used in mixture system of aluminum-chelate-based latent curing agent and silanol compound conventionally, can be used. As such glycidylether type epoxy resin, it is preferable to use epoxy resin having two or more epoxy groups in molecule, and with epoxy equivalent normally in degree of 100 to 4000, and it may be in liquid state or solid state. For example, bisphenol A type epoxy resin, bisphenol F type epoxy resin, phenol novolac type epoxy resin, cresol novolac type epoxy resin, ester type epoxy resin, or the like can be cited. Among them, it is preferable to use bisphenol A type epoxy resin from an aspect of resin property. In addition, monomer and oligomer can be contained in these epoxy resin.

In thermosetting epoxy resin composition of the present invention, oxetane compound can be used simultaneously as resin component, other than such glycidylether type epoxy resin, in order to sharpen exothermic peak. As preferable oxetane compound, 3-ethyl-3-hydroxymethyloxetane, 1,4-bis {[(3-ethyl-3-oxetanyl) methoxy]methyl}benzene, 4,4'-bis [(3-ethyl-3-oxetanyl) methoxymethyl]biphenyl, 1,4-benzene dicarboxylic acid bis [(3-ethyl-3-oxetanyl)]methylester, 3-ethyl-3-(phenoxymethyl) oxetane, 3-ethyl-3-(2-ethylhexyloxymethyl) oxetane, di [1-ethyl (3-oxetanyl)] methylether, 3-ethyl-3-{ [3-(triethoxysilyl) propoxy] methyl}oxetane, oxetanyl silsesquioxane, phenol novolac oxetane, or the like can be cited. When using oxetane compound, used amount of oxetane compound is preferably 10 to 100 mass parts, more preferably 20 to 70 mass parts, with respect to 100 mass parts of epoxy resin.

As described in paragraphs 0007 to 0010 of JP Publication No. 2002-212537 A, silane compound blended in thermosetting epoxy resin composition of the present invention is having a function to initiate cationic polymerization of thermosetting resin (for example, thermosetting epoxy resin) by working together with aluminum-chelating agent held on aluminum-chelate-based latent curing agent. Therefore, by using silane compound together with aluminum-chelating agent, effect to accelerate curing of epoxy resin can be obtained. As such silane compound, high sterically hindered silanol compound, silane coupling agent having one to three low grade alkoxy groups in molecule, or the like can be cited. In addition, it may comprise a group having reactivity with respect to functional group of thermosetting resin in molecule of silane coupling agent, for example, vinyl group, styryl group, acryloyloxy group, methacryloyloxy group, epoxy group, amino group, mercapto group, or the like, but coupling agent having amino group or mercapto group can be used, when amino group or mercapto group does not capture generated cationic species substantially, as latent curing agent of the present invention is cationic curing agent.

When high sterically hindered silanol compound is used as silane compound, blending amount of high sterically hindered silanol compound in aluminum-chelate-based latent curing agent of the present invention is preferably 1 to 50 mass parts, more preferably 1 to 30 mass parts, with respect to 100 mass parts of thermosetting epoxy resin, as curing will be insufficient if the blending amount of silanol compound is too low, and as resin property after curing will be decreased if the blending amount of silanol compound is too high.

High sterically hindered silanol compound used in thermosetting epoxy resin composition of the present invention is arylsilanol having chemical structure of following formula (A), and differs from conventional silane coupling agent having trialkoxy group.

(Ar)$_m$Si(OH)$_n$        (A)

In the formula, m is 2 or 3, and preferably 3, but sum of m and n is 4. Therefore, silanol compound of the formula (A) is monool or diol. 'Ar_ is aryl group which may be substituted, but as aryl group, phenyl group, naphthyl group (for example, 1, 2 or 9-naphthyl group), anthracenyl group (1, 2 or 9-anthracenyl group, benz [a]-9-anthracenyl group), phenallyl group (for example, 3 or 9-phenallyl group), pyrenyl group (for example, 1-pyrenyl group), azulenyl group, fluorenyl group, biphenyl group (for example, 2, 3 or 4-biphenyl group), thienyl group, furyl group, pyrrolyl group, imidazolyl group, pyridyl group, or the like can be cited. Among them, phenyl group is preferable from an aspect of cost and easiness of acquisition. m pieces of Ar may be identical to each other or may be different to each other, but from an aspect of easiness of acquisition, it is preferable to be identical.

These aryl groups can have 1 to 3 substitutes, and for example, electron withdrawing group such as halogen such as chloro or bromo; trifluoromethyl; nitro; sulfo; carboxyl; alkoxycarbonyl such as methoxycarbonyl or ethoxycarbonyl; formyl; and electron donating group such as alkyl such as methyl, ethyl or propyl; alkoxy such as methoxy or ethoxy; hydroxy; amino; monoalkylamino such as monomethylamino; dialkylamino such as dimethylamino, or the like can be cited. In addition, it is possible to increase acidity of hydroxyl group of silanol by using electron withdrawing group as substituent, and vice versa, it is possible to decrease acidity by using electron donating group, so it will be possible to control activity of curing. Here, substituents may be different per m pieces of Ar, but it is preferable that substituents are identical in m pieces of Ar from an aspect of easiness of acquisition. In addition, substituent may be existed only in some of Ar, and there may be no substituent in other Ar. As concrete examples of phenyl group having substituent, 2, 3 or 4-methyl phenyl group; 2,6-dimethyl, 3,5-dimethyl, 2,4-dimethyl, 2,3-dimethyl, 2,5-dimethyl or 3,4-dimethyl phenyl group; 2,4,6-trimethyl phenyl group; 2 or 4-ethyl phenyl group, or the like can be cited.

Among silanol compound of the formula (A), triphenyl silanol or diphenyl silane diol can be cited as preferable. Triphenyl silanol is especially preferable.

On the other hand, when silane coupling agent having one to three low grade alkoxy groups in molecule is used as silane compound, blending quantity of silane coupling agent in aluminum-chelate-based latent curing agent is preferably 1 to 300 mass parts, more preferably 1 to 100 mass parts with respect to 100 mass parts of aluminum-chelate-based latent curing agent, as addition effect cannot be expected if the blending quantity is too low, and as it occurs influence of polymerization terminating reaction by silanolate anion generated from silane coupling agent if the blending quantity is too high.

As concrete examples of silane coupling agent which can be used in aluminum-chelate-based latent curing agent, vinyltris ($\beta$-methoxy ethoxy) silane, vinyltriethoxysilane, vinyltrimethoxysilane, ∴ styryl trimethoxysilane, ∴ methacryloxypropyl trimethoxysilane, ∴ acryloxypropyl trimethoxysilane, $\beta$-(3,4-epoxycyclohexyl) ethyltrimethoxysilane, ∴ glycidoxypropyl trimethoxysilane, ∴ glycidoxypropyl methyldiethoxysilane, N-$\beta$-(aminoethyl)-∴ aminopropyl trimethoxysilane, N-$\beta$-(aminoethyl)-∴ aminopropyl methyldimethoxysilane, ∴ aminopropyl triethoxysilane, N-phenyl-∴ aminopropyl trimethoxysilane, ∴ mercaptopropyl trimethoxysilane, ∴ chloropropyl trimethoxysilane, or the like can be cited.

Thermosetting epoxy resin composition of the present invention obtained in this way is additionally filled with aluminum-chelating agent as curing agent, and using aluminum-chelate-based latent curing agent with improved latency by performing activity inhibition treatment to its surface by epoxy-alkoxy-silane coupling agent, so it is excellent in storage stability and solvent resistance, even if it is one-pack type. In addition, even if it is containing glycidylether type epoxy resin which cannot be cured sufficiently by aluminum-chelate-based latent curing agent, high sterically hindered silanol compound is contained in aluminum-chelate-based latent curing agent without impairing accelerating function of catalyst for cationic polymerization, so cationic polymerization of thermosetting epoxy resin composition is possible by low temperature rapid curing.

As explained in the above, thermosetting epoxy resin composition of the present invention contains aluminum-chelate-based latent curing agent produced by the production process of the present invention, epoxy resin and silane compound. Here, preferable silane compound is triphenyl silanol, and also, preferable epoxy resin is alicyclic epoxy resin.

Thermosetting epoxy resin composition of the present invention is able to make viscosity increase after being left at room temperature for 48 hours to be equal to or less than double of initial ratio, even when alicyclic epoxy resin, preferably 3˝,4˝-epoxycyclohexyl methyl 3,4-epoxycyclohexane carboxylate is used as epoxy resin. In addition, it is possible to make viscosity increase rate to be equal to or less than 20% of initial ratio, even if it is left at room temperature for 4 hours in presence of solvent of propyleneglycol monomethylether acetate or the like.

EXAMPLES

Hereinafter, explaining concretely about the present invention.

Example 1

<Step A: Step for Preparing Particulate Curing Agent>
(Preparation of Aqueous Phase)

800 mass parts of distilled water, 0.05 mass parts of surfactant (NEWREX R, NOF Corporation), and 4 mass parts of polyvinyl alcohol (PVA-205, KURARAY CO., LTD.) as dispersing agent were added into a container for interfacial polymerization of 3 liter with thermometer, and uniformly mixed to prepare aqueous phase.
(Preparation of Oil Phase)

Next, 80 mass parts of 24% isopropanol solution (Aluminum Chelate D, Kawaken Fine Chemicals Co., Ltd.) of aluminummonoacetyl acetonatebis (ethyl acetoacetate), 80 mass parts of trimethylolpropane (1 mol) adduct of methylene diphenyl-4, 4˝-diisocyanate (3 mol) as polyfunctional isocyanate compound, and 80 mass parts of triphenyl silanol (Tokyo Chemical Industry Co., Ltd.) were dissolved in 120 mass parts of ethyl acetate to prepare oil phase.
(Interfacial Polymerization)

Prepared oil phase was added into previously prepared aqueous phase, and after mixed to be emulsified by homogenizer (10000 rpm/5 minutes: T-50, IKA Japan Co., Ltd.), interfacial polymerization was performed while stirring with 200 rpm for 6 hours at 70 増. After end of reaction, polymerization reaction solution was cooled to room temperature, and generated interfacial polymerization resin particles were filtrated by filtration, filtered and washed by distilled water, and aggregated curing agent not performed with surface activity inhibition treatment was obtained by natural drying at room temperature. And, particulate curing agent was obtained by disintegrating this aggregated curing agent into primary particles by using disintegrating device (A-O Jet Mill, SEISHIN ENTERPRISE CO., LTD.).

Thermosetting epoxy resin composition for DSC measurement was obtained by uniformly mixing 4 mass parts of particulate curing agent, 80 mass parts of bisphenol A type epoxy resin (EP828, Mitsubishi Chemical Corporation) and 8 mass parts of triphenyl silanol (Tokyo Chemical Industry Co., Ltd.).
(Differential Scanning Calorimetry (DSC) and Thermogravimetry-Differential Thermal Analysis (TG-DTA) of Particulate Curing Agent)

Differential scanning calorimetry (DSC) of this thermosetting epoxy resin composition was performed in a condition of evaluation amount 5 mg and temperature increase rate 10 増/min by using differential thermal analyzer (DSC6200, Hitachi High-Tech Science Corporation). In addition, in a case of thermogravimetry-differential thermal analysis (TG-DTA), the measurement was performed by using particulate curing agent directly in a condition of evaluation amount 5 mg and temperature increase rate 10 増/min by using thermal analyzer (TG/DTA6200, Hitachi High-Tech Science Corporation). Obtained DSC chart is illustrated in FIG. 1, and obtained TG-DTA chart is illustrated in FIG. 2.

Figure 2:
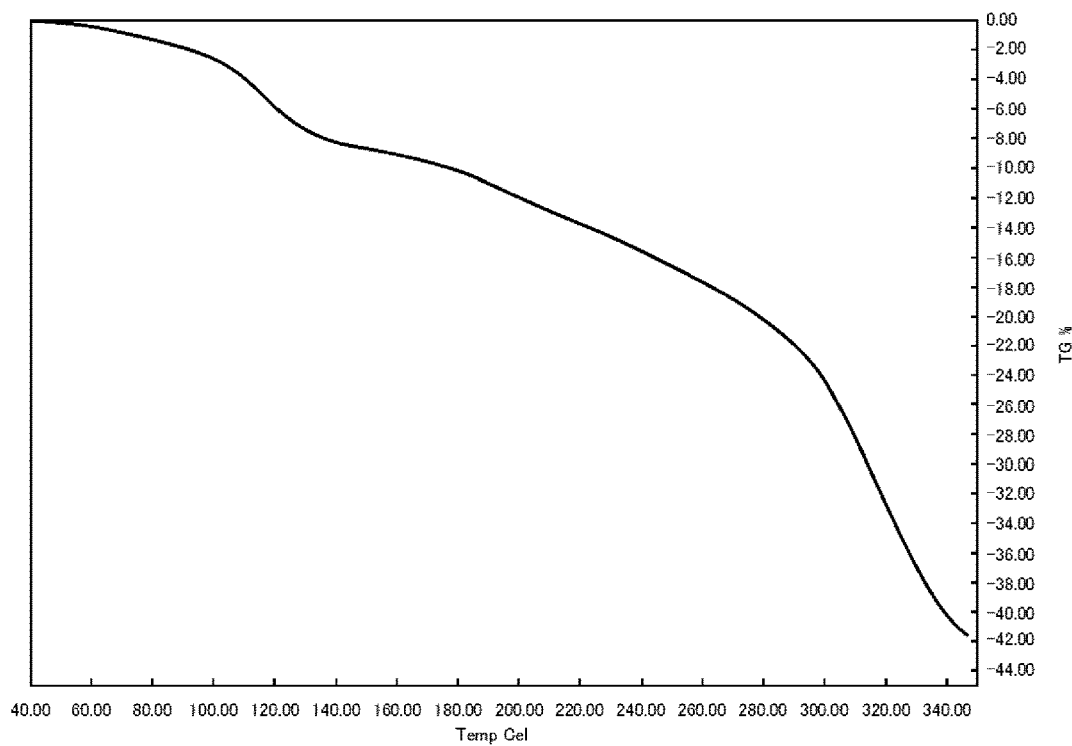
FIG. 2 is a TG-DTA chart of particulate curing agent prepared by the step A of example 1.

As can be understood from FIG. 1, start of heat generation was simultaneous with start of measurement, exothermic peak temperature was 89.9 増, and total amount of heat generation was −407 J/g. In addition, as can be understood from FIG. 2, weight reduction rate until 260 増 was −17.7%. From these results, when blending quantity of catalyst (aluminum-chelating agent and triphenyl silanol) was twice as monomer, it was not able to confirm latency of particulate curing agent. In addition, weight reduction to the extent of about 18% of total weight was observed. From this, it was understood that amount of catalyst (aluminum-chelating agent and triphenyl silanol) held on particulate curing agent was about 18%.
<Step B: Step for Additional Filling Aluminum-Chelating Agent>

15 mass parts of particulate curing agent obtained in the step A was added into aluminum-chelating agent solution, in which 12.5 mass parts of aluminum-chelating agent (Aluminum Chelate D, Kawaken Fine Chemicals Co., Ltd.) and 25 mass parts of another aluminum-chelating agent (ALCH-TR, Kawaken Fine Chemicals Co., Ltd.) were dissolved in 62.5 mass parts of ethyl acetate, and stirred in stirring rate of 200 rpm while volatilizing ethyl acetate for 9 hours at 80 増. After end of stirring, aggregated curing agent was obtained by performing filtration and by washing with cyclohexane. After vacuum drying this aggregated curing agent for 4 hours at 30 増, it was disintegrated into primary particles by using disintegrating device (A-O Jet Mill, SEISHIN ENTERPRISE CO., LTD.) to obtain 11 mass parts of particulate curing agent additionally filled with aluminum-chelating agent. In addition, amount of ethyl acetate in filtrate was an amount in which 90% of initial amount have been removed.

In addition, in this step, it can be considered that a reason that acquisition amount of particulate curing agent was decreased to 11 mass parts from added amount of 15 mass parts was because triphenyl silanol in curing agent was eluted into ethyl acetate. As a result, it can be considered that parts in which triphenyl silanol in curing agent has been eluted (i.e. parts capable of holding aluminum-chelating agent) were increased, and aluminum-chelating agents were additionally filled in such parts.

In addition, thermosetting epoxy resin composition for DSC measurement was obtained in same manner as the step A, except that particulate curing agent additionally filled with aluminum-chelating agent was used.

(Differential Scanning Calorimetry (DSC) and Thermogravimetry-Differential Thermal Analysis (TG-DTA) of particulate curing agent)

This thermosetting epoxy resin composition was performed of differential scanning calorimetry (DSC) in a condition same as the step A. In addition, thermogravimetry-differential thermal analysis (TG-DTA) was performed in a condition same as the step A, by using particulate curing agent directly. Obtained DSC chart is illustrated in FIG. 3, and obtained TG-DTA chart is illustrated in FIG. 4.

Figure 3:
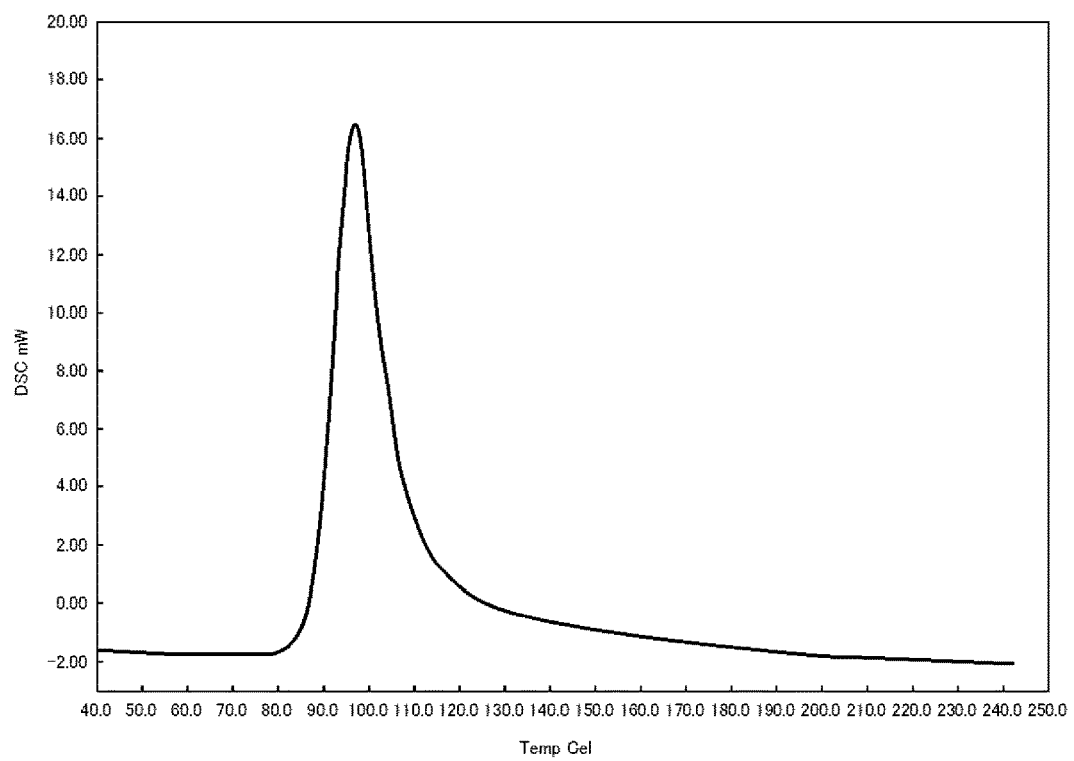
FIG. 3 is a DSC chart of thermosetting epoxy resin composition using particulate curing agent prepared by the step B of example 1.
Figure 4:
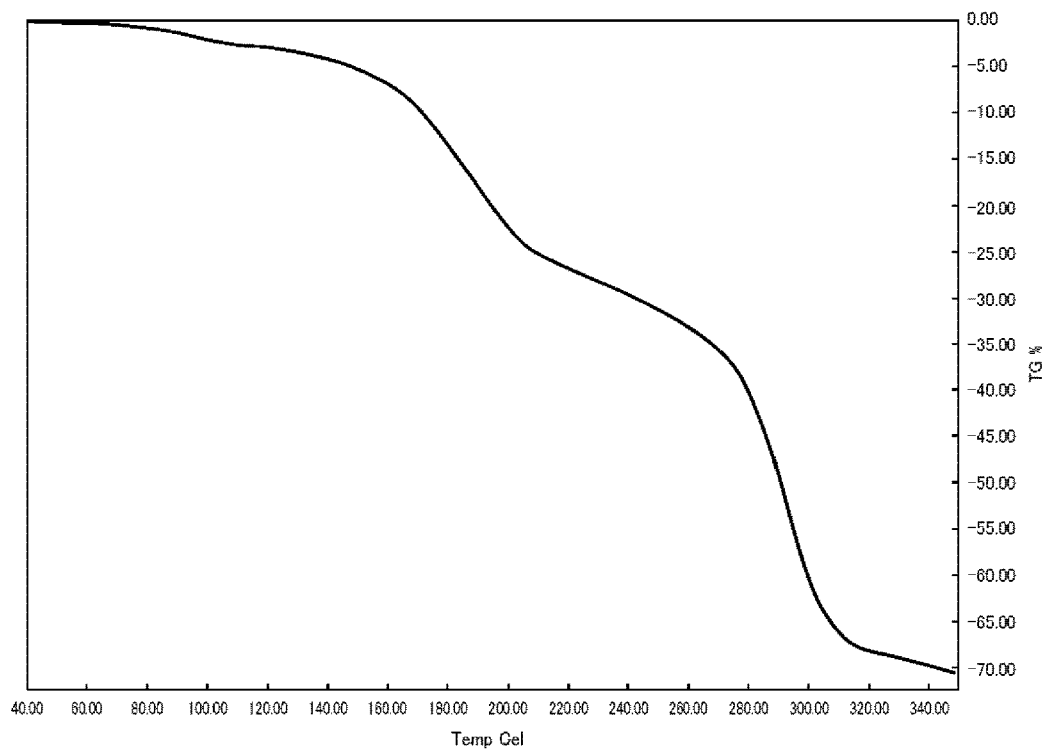
FIG. 4 is a TG-DTA chart of particulate curing agent prepared by the step B of example 1.

As can be understood from FIG. 3, starting temperature of heat generation was 77.5°C, exothermic peak temperature was 96.7°C, and total amount of heat generation was −442 J/g. This shows that latency of curing agent was improved. It can be considered that this is because triphenyl silanol in curing agent was eluted into ethyl acetate. In addition, as can be understood from FIG. 4, weight reduction rate until 260°C was −33.1%. Therefore, it was understood that amount of catalyst (aluminum-chelating agent and triphenyl silanol) held on particulate curing agent was 33.1%, and that filled amount was increased from about 18% to about 33% by going through the step B.

<Step C: Step for Surface Activity Inhibition Treatment>

30 mass parts of particulate curing agent additionally filled with aluminum-chelating agent obtained in the step B was added into solution in which 240 mass parts of epoxy-alkoxy-silane coupling agent (KBM-303, Shin-Etsu Chemical Co., Ltd.) was dissolved in 60 mass parts of cyclohexane, and stirred with 200 rpm for 8 hours at 30°C. While stirring, particulate curing agent was performed with surface activity inhibition treatment, by forming a coating derived from epoxy-alkoxy-silane coupling agent on a surface of particulate curing agent. After end of stirring, aggregated curing agent was obtained by performing filtration and by washing with cyclohexane. After vacuum drying this aggregated curing agent for 4 hours at 30°C, it was disintegrated into primary particles by using disintegrating device (A-O Jet Mill, SEISHIN ENTERPRISE CO., LTD.) to obtain aluminum-chelate-based latent curing agent performed with surface activity inhibition treatment, and also, additionally filled with aluminum-chelating agent.

<Evaluation of Aluminum-Chelate-Based Latent Curing Agent>

About aluminum-chelate-based latent curing agent obtained by the example 1, 'measurement of particle size distribution_, 'electron microscopic observation_, 'evaluation of gel time_, 'DSC measurement_, 'liquid life evaluation_ and 'evaluation of solvent resistance_ were performed as explained in below.

'Measurement of Particle Size Distribution_

Figure 5:
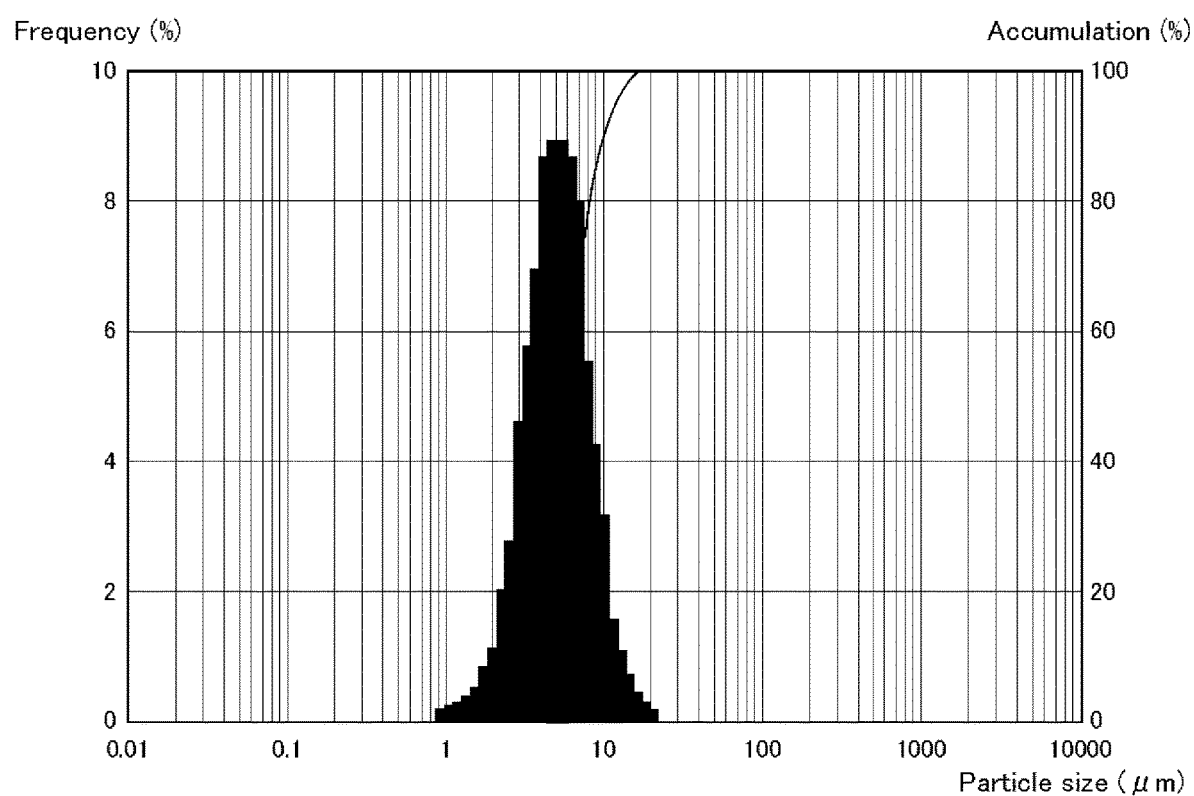
FIG. 5 is a particle size distribution chart of aluminum-chelate-based latent curing agent performed with surface activity inhibition treatment in the step C of example 1.

Particle size distribution of aluminum-chelate-based latent curing agent of the example 1 was measured using laser type particle size distribution measuring device (MT3300EX II, NIKKISO CO., LTD.). Particle size distribution chart is illustrated in FIG. 5. Average particle size was 5.5≈m, and CV value was 37.9%. In addition, peak of aggregation of curing agent was not observed.

'Electron Microscopic Observation _

Figure 6A:
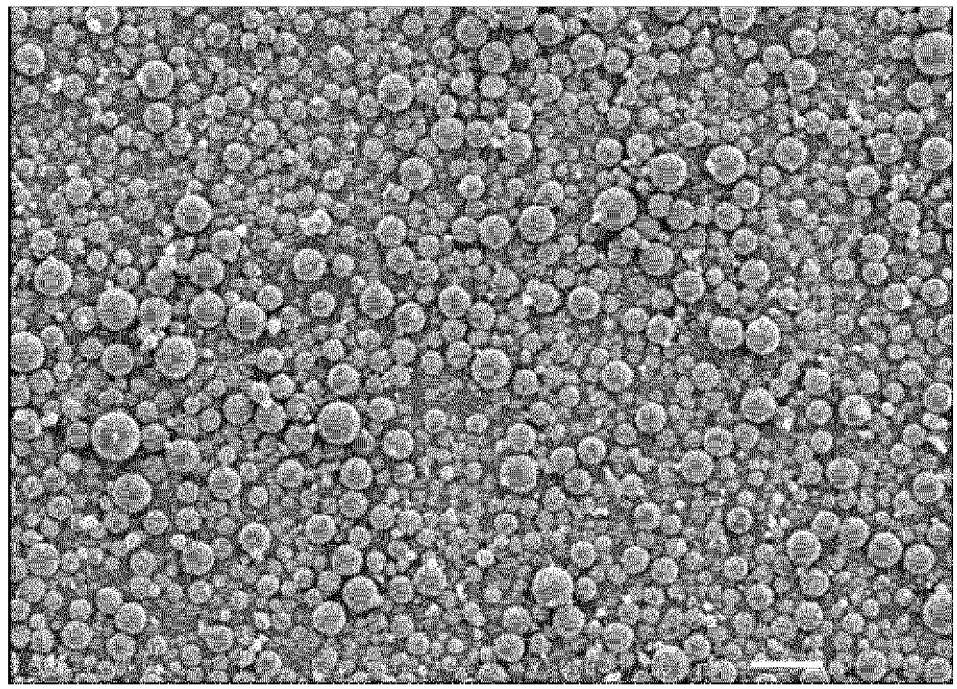
FIG. 6A is an electron micrograph (1000 magnifications) of aluminum-chelate-based latent curing agent performed with surface activity inhibition treatment in the step C of example 1.
Figure 6B:
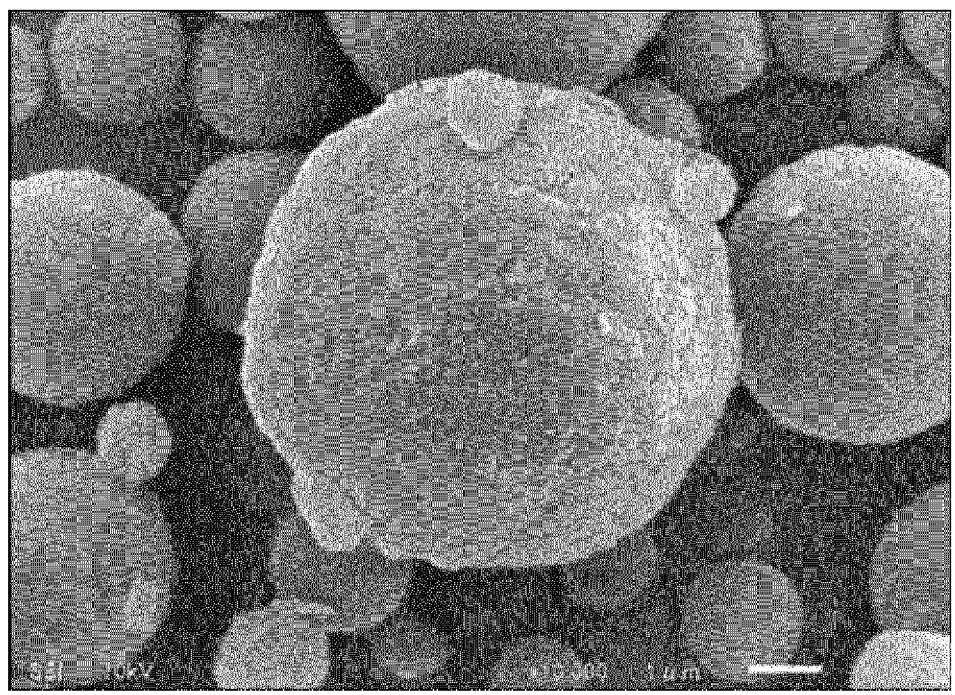
FIG. 6B is an electron micrograph (10000 magnifications) of aluminum-chelate-based latent curing agent performed with surface activity inhibition treatment in the step C of example 1.

Electron micrograph of aluminum-chelate-based latent curing agent of the example 1 was obtained using scanning electron microscope (JSM-6510A, JEOL Ltd.). SEM photograph of 1000 magnifications is illustrated in FIG. 6A. SEM photograph of 10000 magnifications is illustrated in FIG. 6B. From these photographs, it can be understood that excellent particle condition without foreign substance and aggregate was maintained, even after surface activity inhibition treatment.

'DSC Measurement_

Thermosetting epoxy resin composition for DSC measurement was obtained by uniformly mixing 4 mass parts of aluminum-chelate-based latent curing agent, 80 mass parts of bisphenol A type epoxy resin (EP828, Mitsubishi Chemical Corporation) and 8 mass parts of triphenyl silanol (Tokyo Chemical Industry Co., Ltd.).

Thermal analysis (DSC) of this thermosetting epoxy resin composition was performed in a condition of evaluation amount 5 mg and temperature increase rate 10°C/min by using differential thermal analyzer (DSC6200, Hitachi High-Tech Science Corporation). Obtained DSC chart is illustrated in FIG. 7.

Figure 7:
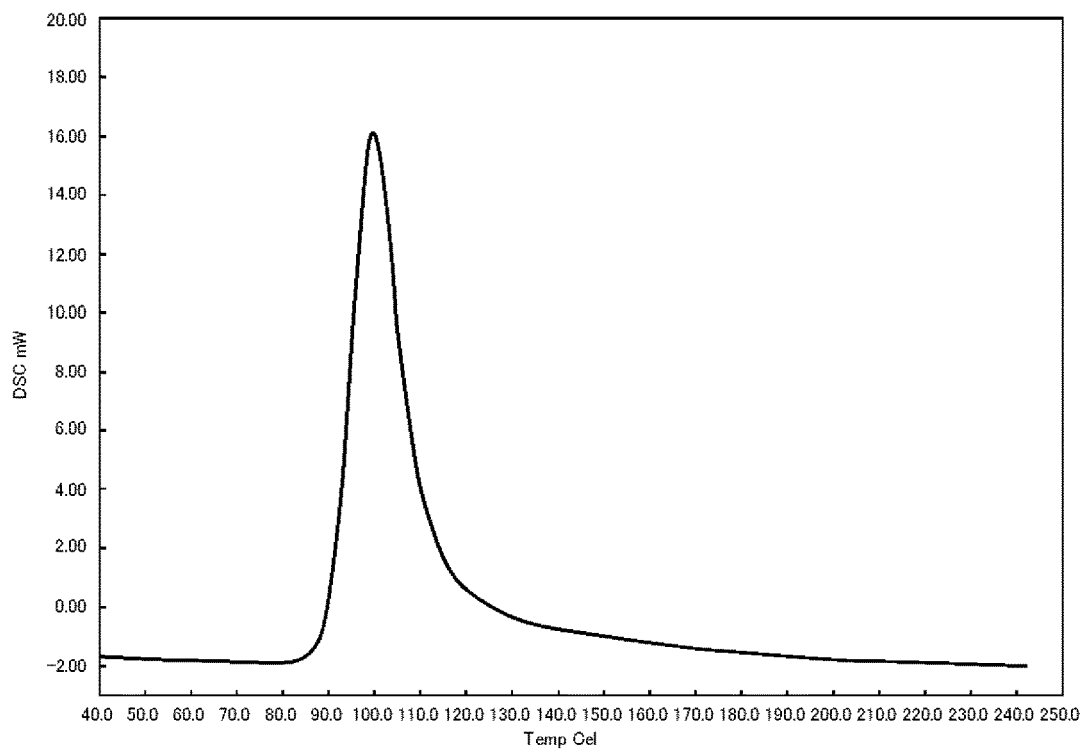
FIG. 7 is a DSC chart of thermosetting epoxy resin composition using aluminum-chelate-based latent curing agent performed with surface activity inhibition treatment in the step C of example 1.

As can be understood from FIG. 7, starting temperature of heat generation became 82.5°C from 77.5°C measured before surface activity inhibition treatment, exothermic peak temperature became 99.5°C from 96.7°C measured before surface activity inhibition treatment, and total amount of heat generation became −411 J/g from −442 J/g measured before surface activity inhibition treatment. From these results, it can be understood that starting temperature of heat generation and exothermic peak temperature were shifted to high temperature side by surface activity inhibition treatment.

'Evaluation of Gel Time_

Composition for evaluation of gel time was prepared by uniformly mixing 100 mass parts of alicyclic epoxy compound (CEL2021P (3ʹ, 4ʺ-epoxycyclohexyl methyl 3, 4-epoxycyclohexane carboxylate), Daicel Corporation), 5 mass parts of triphenyl silanol (Tokyo Chemical Industry Co., Ltd.), and 2 mass parts of aluminum-chelate-based latent curing agent of the example 1 performed with surface activity inhibition treatment. 1 g of this composition was placed on plate surface of shamal hot plate (HHP-412, AS ONE Corporation) heated to 80°C or 100°C, and time for gelation (gel time) was measured. As a result, gel time at 80°C was 30 seconds, and gel time at 100°C was 8 seconds. From this result, it can be understood that aluminum-chelate-based latent curing agent of the present invention shows excellent low temperature rapid curability 'Liquid Life Evaluation_

Figure 8:
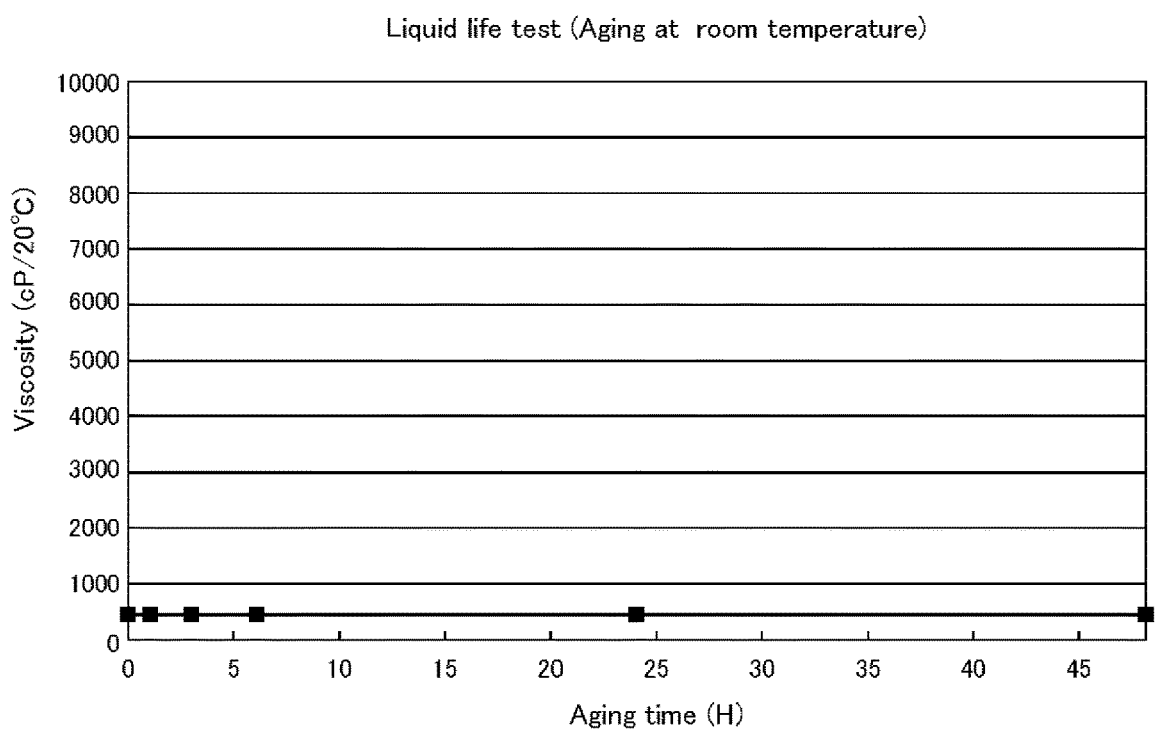
FIG. 8 is a liquid life chart of thermosetting epoxy resin composition using aluminum-chelate-based latent curing agent performed with surface activity inhibition treatment in the step C of example 1.

Composition for evaluation of gel time with same formulation as evaluation for gel time was prepared, and used as composition for liquid life evaluation. Condition of liquid life evaluation was to measure viscosity at 20°C by using vibration type viscometer (SV-10, A & D Company, Limited) after predetermined time has passed from leaving the composition at room temperature (aging). Obtained results were illustrated in Table 1 and FIG. 8 (liquid life chart). From these results, it can be understood that composition for liquid life evaluation containing high reactive alicyclic epoxy compound was not thickened even after stored for 48 hours, and showed excellent latency even it shows low temperature rapid curability.

TABLE 1

| Initial stage | 1 hour later | 3 hours later | 6 hours later | 24 hours later | 48 hours later | 48 hours later/ initial stage |
|---|---|---|---|---|---|---|
| 466.89 cP | 469.21 cP | 467.18 cP | 465.43 cP | 466.57 cP | 466.62 cP | 1.0 |

'Evaluation of Solvent Resistance_

Thermosetting epoxy resin composition for evaluation of solvent resistance was obtained by uniformly mixing 6 mass parts of aluminum-chelate-based latent curing agent, 60 mass parts of bisphenol A type epoxy resin (EP828, Mitsubishi Chemical Corporation), 6 mass parts of triphenyl silanol (Tokyo Chemical Industry Co., Ltd.), and 20 mass parts or 40 mass parts of propyleneglycol monomethylether acetate (PMA).

Viscosity at 20℃ of this thermosetting epoxy resin composition was measured by using vibration type viscometer (SV-10, A & D Company, Limited) after predetermined time has passed from leaving the composition at room temperature (aging). Obtained result was illustrated in Table 2. From this result, it can be understood that it showed excellent solvent resistance when liquid viscosity was equal to or more than predetermined numerical value. For example, when initial liquid viscosity was about 266 cP, thickening could not be confirmed in a condition to leave the composition at room temperature for 4 hours.

TABLE 2

| PMA (Parts by weight) | Initial stage | 2 hours later | 4 hours later | 4 hours later/ initial stage |
|---|---|---|---|---|
| 20 | 265.88cP | 265.80cP | 265.097cP | 1.00 |
| 40 | 53.06cP | 59.16cP | 61.59cP | 1.16 |

Aluminum-chelate-based latent curing agent of the present invention was additionally filled with aluminum-chelating agent, and also, it is performed with surface activity inhibition treatment, so it shows excellent low temperature rapid curability, one-pack storage stability, and solvent resistance. Especially, application for epoxy applied system which requires solvent resistance will be possible. In addition, not only it is excellent in low temperature rapid curability, but also it is excellent in liquid life in one-pack under coexistence of alicyclic epoxy compound. It is possible to hold a large quantity of aluminum-chelating agents in curing agent, so it is possible to decrease amount added to resin composition to be cured. Thus, it is useful as curing agent for thermosetting epoxy resin composition.

The invention claimed is:

1. A process for producing aluminum-chelate-based latent curing agent in which aluminum-chelating agent and silane compound are held on porous resin obtained by subjecting polyfunctional isocyanate compound to interfacial polymerization, wherein the process comprises following steps (A) to (C):

(Step A: Step for preparing particulate curing agent)
a step for preparing particulate curing agent by subjecting polyfunctional isocyanate compound to interfacial polymerization to obtain porous resin by adding oil phase obtained by dissolving or dispersing aluminum-chelating agent, silane compound and polyfunctional isocyanate compound in volatile organic solvent into aqueous phase containing dispersing agent while heating and stirring, and by holding aluminum-chelating agent and silane compound on obtained porous resin;

(Step B: Step for additionally filling aluminum-chelating agent)
a step for additionally filling aluminum-chelating agent into particulate curing agent by dispersing and mixing particulate curing agent obtained in the step A in aluminum-chelating agent solution in which aluminum-chelating agent is dissolved in volatile organic solvent, and by removing volatile organic solvent while stirring obtained dispersed mixture;

(Step C: Step for surface activity inhibition treatment)
a step for obtaining aluminum-chelate-based latent curing agent latently presented by surface activity inhibition treatment with epoxy-alkoxy-silane coupling agent, by immersing particulate curing agent additionally filled with aluminum-chelating agent in solution in which epoxy-alkoxy-silane coupling agent is dissolved in organic solvent.

2. The process according to claim 1, wherein silane compound is triphenyl silanol.

3. The process according to claim 1, wherein removal of volatile organic solvent in the step B is performed by heating dispersed mixture to a temperature equal to or more than boiling point of volatile organic solvent.

4. The process according to claim 3, wherein epoxy-alkoxy-silane coupling agent is 2-(3,4-epoxycyclohexyl) ethyltrimethoxysilane or 3-glycidoxypropyl trimethoxysilane.

5. The process according to claim 1, wherein radically polymerizable compound and initiator of radical polymerization are blended in oil phase of the step A.

6. The process according to claim 1, wherein content of aluminum-chelating agent in oil phase of the step A is 10 to 500 mass parts with respect to 100 mass parts of polyfunctional isocyanate compound.

7. A process for producing thermosetting epoxy resin composition comprising:
adding aluminum-chelate-based latent curing agent produced by the process according to claim 1 to epoxy resin and silane compound.

8. The process for producing thermosetting epoxy resin composition according to claim 7, wherein silane compound is triphenyl silanol.

9. The process for producing thermosetting epoxy resin composition according to claim 7, wherein epoxy resin is alicyclic epoxy resin, and viscosity increase after being left at room temperature for 48 hours is equal to or less than double of initial ratio.

10. The process for producing thermosetting epoxy resin composition according to claim 9, wherein alicyclic epoxy resin is 3',4'-epoxycyclohexyl methyl 3,4-epoxycyclohexane carboxylate.

11. The process for producing thermosetting epoxy resin composition according to claim 7, wherein viscosity increase rate after being left at room temperature for 4 hours in presence of solvent is equal to or less than 20% of initial ratio.

12. The process for producing thermosetting epoxy resin composition according to claim 11, wherein liquid viscosity after blending of solvent is equal to or more than 200 cP.

13. The process for producing thermosetting epoxy resin composition according to claim 12, wherein solvent is propyleneglycol monomethylether acetate.

14. Aluminum-chelate-based latent curing agent in which aluminum-chelating agent and silane compound are held on porous resin obtained by subjecting polyfunctional isocyanate compound to interfacial polymerization, wherein
a coating derived from epoxy-alkoxy-silane coupling agent is formed on a surface of aluminum-chelate-based latent curing agent.

15. Aluminum-chelate-based latent curing agent in which aluminum-chelating agent and silane compound are held on porous resin obtained by subjecting polyfunctional isocyanate compound to interfacial polymerization, wherein
aluminum-chelating agent is additionally filled on a surface of aluminum-chelate-based latent curing agent more than inside of aluminum-chelate-based latent curing agent, and also, a coating derived from epoxyalkoxy-silane coupling agent is formed on a surface of aluminum-chelate-based latent curing agent.

* * * * *